(12) United States Patent
Kiang et al.

(10) Patent No.: US 7,545,312 B2
(45) Date of Patent: Jun. 9, 2009

(54) TARGET DETECTION DEVICE AND ITS DETECTION METHOD

(75) Inventors: Jean-Fu Kiang, Taipei (TW); Po-Jen Tu, Taipei (TW)

(73) Assignee: National Taiwan University, Taipei (TW)

( * ) Notice: Subject to any disclaimer, the term of this patent is extended or adjusted under 35 U.S.C. 154(b) by 64 days.

(21) Appl. No.: 11/984,556

(22) Filed: Nov. 20, 2007

(65) Prior Publication Data

US 2009/0109084 A1    Apr. 30, 2009

(30) Foreign Application Priority Data

Oct. 30, 2007    (TW) ............... 96140755 A

(51) Int. Cl.
*G01S 13/00*    (2006.01)
*G01S 13/08*    (2006.01)
*G01S 13/58*    (2006.01)

(52) U.S. Cl. ............... 342/109; 342/62; 342/95; 342/104; 342/106; 342/118; 342/126; 342/128; 342/130; 342/159

(58) Field of Classification Search ............... 342/59, 342/62, 95–97, 104, 106, 109, 118, 126, 342/128, 130, 195

See application file for complete search history.

(56) References Cited

U.S. PATENT DOCUMENTS

| | | | | |
|---|---|---|---|---|
| 3,952,304 A | * | 4/1976 | Broniwitz et al. | 342/95 |
| 4,128,837 A | * | 12/1978 | Page | 342/67 |
| 4,783,744 A | * | 11/1988 | Yueh | 701/221 |
| 4,839,658 A | * | 6/1989 | Kathol et al. | 342/455 |
| 5,138,321 A | * | 8/1992 | Hammer | 342/36 |
| 5,214,433 A | * | 5/1993 | Alouani et al. | 342/95 |
| 5,343,212 A | * | 8/1994 | Rose et al. | 342/424 |
| 5,479,360 A | * | 12/1995 | Seif et al. | 342/161 |
| 6,215,438 B1 | * | 4/2001 | Oswald et al. | 342/70 |
| 6,225,942 B1 | * | 5/2001 | Alon | 342/59 |
| 6,639,553 B2 | * | 10/2003 | Lin et al. | 342/444 |
| 6,788,734 B2 | * | 9/2004 | Kober et al. | 375/148 |
| 6,822,604 B2 | * | 11/2004 | Hall et al. | 342/28 |

(Continued)

OTHER PUBLICATIONS

General two-stage Kalman filters Chien-Shu Hsieh; Fu-Chuang Chen; Automatic Control, IEEE Transactions on vol. 45, Issue 4, Apr. 2000 pp. 819-824.*

(Continued)

*Primary Examiner*—Thomas H Tarcza
*Assistant Examiner*—Peter M Bythrow
(74) *Attorney, Agent, or Firm*—Rosenberg, Klein & Lee

(57) ABSTRACT

This invention relates to a target detection device and its detection method, comprising: a transmitting unit for transmitting a detecting pulse to detect target which then reflects the detecting pulse to generate a reflected pulse; a plurality of measuring units, located at different positions respectively which receive said reflected pulse and generates measured values of distance and measured values of velocity according to the reflected pulse received; a plurality of two-stage linear Kalman filters, corresponding to said plural measuring units respectively, each of said plural two-stage linear Kalman filters proceeds an operation according to the measured values produced by corresponding measuring unit so as to generate respectively the estimation values of distance, velocity and acceleration; an arithmetic unit connecting to said plural two-stage linear Kalman filters, which proceeds a triangulation operation according to said estimation values so as to generate distance component values, velocity component values and acceleration component values with respect to the target.

12 Claims, 14 Drawing Sheets

U.S. PATENT DOCUMENTS

| | | | | |
|---|---|---|---|---|
| 6,873,251 | B2* | 3/2005 | Schiffmann et al. | 340/436 |
| 7,016,782 | B2* | 3/2006 | Schiffmann | 701/301 |
| 7,079,991 | B2* | 7/2006 | Li et al. | 703/2 |
| 7,129,886 | B2* | 10/2006 | Hall et al. | 342/28 |
| 7,167,810 | B2* | 1/2007 | Kronhamn et al. | 702/182 |
| 7,170,441 | B2* | 1/2007 | Perl et al. | 342/29 |
| 7,209,051 | B2* | 4/2007 | Shankwitz et al. | 340/938 |
| 7,369,941 | B2* | 5/2008 | Schiffmann et al. | 701/301 |
| 7,420,502 | B2* | 9/2008 | Hartzstein et al. | 342/70 |

OTHER PUBLICATIONS

Multiple-Hypothesis Trilateration and Tracking with Distributed Radars van Kleef, J.; Bergmans, J.; Kester, L.; Groen, F.; Information Fusion, 2006 9th International Conference on Jul. 10-13, 2006 pp. 1-7.*

A Kalman filter based registration approach for asynchronous sensors in multiple sensor fusion applications Yifeng Zhou; Acoustics, Speech, and Signal Processing, 2004. Proceedings. (ICASSP '04). IEEE International Conference on vol. 2, May 17-21, 2004 pp. ii-293-296 vol. 2.*

Simultaneous registration and fusion of multiple dissimilar sensors for cooperative driving Li, W.; Henry Leung pp. 84-98 IEEE Transaction Intelligent Transportation Systems vol. 5 Issue 2 Jun. 2004.*

Po-Jen Tu, Effective Algorithm to Detect Anti-ship Missile with High Precision on Location, Velocity and Acceleration, IEEE Transactions on Aerospace and Electronic Systems.

Po-Jen Tu, Effective Algorithm for Target Detection with High Precision on Location. Velocity and Acceleration, Graduate Institute of Communication Engineering, College of Electrial Engineering and Computer Science, National Taiwan University, Master Thesis.

* cited by examiner

TARGET DETECTION DEVICE AND ITS DETECTION METHOD

BACKGROUND OF THE INVENTION

1. Field of the Invention

This invention relates to a radar device, particularly to a target detection device and its detection method.

2. Brief Description of the Prior Art

Nowaday, radar device is widely applied for tracking and searching target. In order to enhance the accuracy of radar for tracking target in one respect and to reduce error so as to improve the accuracy of the radar device in another respect, the academic circle and the industries continuously propose the skill to improve the accuracy, such as an article entitled "A new tracker air-to-air missile targets" in the periodical IEEE Trans. Auto. Control, vol. 24, no. 6, December 1979 written by P. S. Maybeck, J. E. Negro, S. J. Cusmanao, and M. D. O. Jr., the radar device firstly obtains the target distance, the azimuth and the elevation angle, then the component values of the target are obtained. However, the convergence is unable to be finish in short duration so that this method can only be applied to detect the location of the target, and is unable to be used to estimate the location of target during the next time period. In another article entitled "Target tracking based on Kalman-type filters combination with recursive estimation model disturbances" in the periodical IEEE Radar Conf., pp. 115-120, May 2005 written by A. E. Nordsjo and S. B. Dynamics, the extended Kalman filter is used to reduce the error of relative acceleration obtained by the cooperation with the recursive prediction error method. However, the relative acceleration obtained is subject to big change, and thus is unstable.

In another article entitled "Estimation of chirp radar signals in compound-Gaussian clutter: A cyclostationary approach" in the periodical IEEE Trans. Signal Process., vol. 48, no. 4, pp. 1029-1039, April 2000 written by F. Gini, M. Montanari, and L. Verrazzani, the received signal is operated in correlation and the Doppler rate is obtained by Fourier series and maximum-likelihood estimation so as to determine the relative speed and the relative acceleration. However, 256 memory addresses are required for the acquisition of correlation, and 256 samples are needed for the operation of Fourier series and maximum-likelihood estimation so that the time required for the operation is huge. In another article entitled "Search radar detection and track with the Hough transform" in the periodical IEEE Trans. Aero. Electron. Syst., vol. 39, no. 1, pp. 1173-1177, July 1995 written by B. D. Carlson, E. D. Evans, and S. L. Wilson, the radar cooperates with matched filter and scans in the angular range from 0° to 180° by means of $\rho = r \cos \theta + t \sin \theta$ and proceeds sampling per degree of angle. The point with densest concentration on the curve is regarded as $\rho_0$ and $\theta_0$ which will then be substituted into the formula to obtain the relative distance $r_0$. However, if there is an error, the calculation result will deviate greatly. Thus, the scanning should be proceeded in a very dense manner such that the number of operation is substantially increased. In still another article entitled "Robust range alignment via Hough transform in an ISAR image system" in the periodical IEEE Trans. Aero. Electron. Syst., vol. 31, no. 3, pp. 1173-1177, July 1995 written by T. Sauer and A. Schoitch, the radar cooperates with matched filter and scans in a given range of relative velocity v by $r_0 = r(t) + v(t)t$ such that the point with densest concentration on the curve is regarded as the relative velocity $v_0$ and the relative distance $r_0$. Inasmuch as the range of relative velocity for scanning is known, the sampling number can be controlled at 30 so that accuracy can be raised. But, the r-v formed by using 30 samples is not precise enough.

In still another article entitled "Efficient approximation of Kalman filter for target tracking" in the periodical IEEE Trans. Aero. Electron. Syst., vol. 22, no. 1, pp. 8-14, January 1986 written by R. S. Baheti, convergence operation of 5 second duration has to be proceeded so as to reduce the error. However, the location of target is unable to be obtained instantaneously. In still another article entitled "Waveform design principle for automotive radar systems" in the periodical IEEE Radar, October 2001 written by H. Rohling and M. M. Meinecke, the combination of frequency-shift keying (FSK) method and linear frequency modulation (LFM) method is proposed. Each sensor can get two sets of signal at different frequencies such that each sample can provide one set of (r, v). However, the above system is unable to get relative acceleration. In still another article entitled "Velocity and acceleration estimation of Doppler weather radar/lidar signal in colored noised" in the periodical IEEE Acous. Speech Signal Process., vol. 3, pp. 2052-2055, 1995 written by W. Chen, G. Zhou, and G B. Giannakis, relative velocity and relative acceleration can be obtained by using the correlation among the 128 received samples and in cooperation with the multiple signal classification (MUSIC). However, the total operating time will be prolonged by the time required for sampling.

In still another article entitled as "Improved estimation of hyperbolic frequency modulated chirp signals" in the periodical IEEE Trans. Signal Process., vol. 47, no. 5, pp. 1384-1388, May 1999 written by O. Besson, G. B. Giannakis, N orders of sampling should be proceeded so as to obtain relative velocity and relative acceleration. Therefore, the time duration is quite long. In another article entitled "Robust two-stage Kalman filters for systems with unknown inputs" in the periodical IEEE Trans. Auto. Control, vol. 45, no. 12, pp. 2374-2378, December 2000 written by C. S. Hsieh, a linear system is provided that is incapable of performing operation treatment for non-linear condition. In another article entitled "Tracking systems for automotive radar networks" in the periodical IEEE Radar, pp. 339-343, October 2002 written by D. Oprisan and H. Rohling, three operation methods are disclosed. The first method has excessive number of operations so that the duration for operation is longer. The second and the third methods use extended Kalman filter to proceed operation which reduces the accuracy, though efficiency is increased.

In yet another article entitled as "A robust tracker with real time inputs estimation" in the periodical IEEE Signal Process., vol. 2, pp. 1529-1531, October 1998 written by F. Xinxi and X. Lizhen, the convergence time required to obtain the relative acceleration from the relative position and the relative velocity takes 20 seconds that might be too long to respond to a maneuvering target. In still another article entitled "An alternate derivation and extension of Friendland's two-stage Kalman estimator" in the periodical IEEE Trans. Auto. Control, vol. 26, no. 3, pp. 746-750, June 1981 written by M. B. Ignagni, the relative velocity and the relative acceleration can be obtained from the observed relative position. However, the components on X and Y axes cannot be obtained. In yet another article entitled "An automotive radar network based on 77 GHz FMCW sensors" in the periodical IEEE Radar Conf., pp. 871-876, May 2005 written by F. Folster, H. Rohling and U. Lubbert, operation is proceeded by using of extended Kalman filter directly to obtain the components of position and velocity. However, the relative velocity and the relative position are not obtained at first hand, so that the accuracy in the relative acceleration is reduced.

In still another article entitled as "Adaptive interacting multiple model tracking of maneuvering targets" in the periodical IEE Proc.-Radar Sonar Naving., vol. 42, no. 1, pp. 11-17, February 1985 written by J. R. Layne and C. Piyasena, the components on X and Y axes should be obtained firstly so that the relative acceleration can be obtained according to five two-stage Kalman filters. However, complexity in the operation is increased. In yet another article entitled "General two-stage extended Kalman filters" in the periodical IEEE Trans. Auto. Control, vol. 48, no. 2, pp. 289-293, February 2003 written by C. S. Hsieh, the extended two-stage Kalman filter is directly used to compute components of the position, the velocity and the acceleration on X and Y axes from the measured relative distance and the relative velocity. However, the accuracy of the acceleration is reduced. In still another article entitled "Maneuver target tracking with acceleration estimation using target past positions" in the periodical IEEE Radar, pp. 718-722, October 2001 written by M. Hashiro, T. Kwase and I. Sasase, the samples in the preceding three samplings are used to estimate the relative acceleration during the next time period, and then the components of the position and the velocity on X and Y axes can be computed using the weight coefficient. However, the acceleration with direction change cannot be estimated.

In yet another article entitled "An explicit high-resolution DOA estimation formula for two wave source" in the periodical IEEE Acous. Speech Signal Process., vol. 4, pp. 893-896, 2006 written by K. Ichige, N. Takabe, and H. Arai, two hundred samples are used to calculate the correlation, so the marching direction is obtained from the matrix of correlation and the distance from the target is operated. However, sampling of N times should be proceeded firstly, then the operation can be proceeded later. In still another article entitled "Simultaneous registration and fusion of multiple dissimilar sensors for cooperative driving" in the periodical IEEE Trans. Intell. Transp. Syst., vol. 5, no. 2, pp. 84-98, June 2004 written by W. Liand and H. Leung, an unscented Kalman filter is used to obtain the components of position, velocity and acceleration as well as the angle in horizontal direction and the angle in vertical direction. However, the convergence time is required to obtain the relative acceleration from the relative position and the relative velocity is 15 seconds which might be too long to respond to a maneuvering target. In yet another article entitled "General two-stage Kalman filters" in the periodical IEEE Trans. Auto. Control, vol. 45, no. 4, pp. 819-824, April 2000 written by C. S. Hsieh and F. C. Chen, the sampling time is 10 seconds and the simulation time is 500 seconds. Only the position can be detected with such short-period detection, and the position estimation during the next time period is unable to be proceeded.

In FIG. 1, a block diagram of a conventional target detection device is shown. As shown in the figure, the conventional target detection device 10 comprises a transmitting unit 12, a plurality of measuring units 14 and an extended Kalman filter 16, in which the extended Kalman filter 16 is connected to the plural measuring units 14. The transmitting unit 12 transmits detecting pulse 122 to a target 20 which will then reflect the detecting pulse 122 to generate a reflected pulse 202. The reflected pulse 202 is received respectively by the plural measuring units 14 which generate measured values of relative distance and relative velocity according to the reflected pulse 202. The extended Kalman filter 16 generates directly the components of the distance, the velocity and the acceleration in X and Y axes according to the measured values generated by the plural measuring units 14. As shown in FIGS. 2A to 2F, the detection errors of the conventional target detection device 10 are shown. The X coordinate axes of FIGS. 2A to 2F are all t/Tp which is a time parameter. While the Y axes of FIGS. 2A to 2F are error values. The values $\hat{x}(t)$, $\hat{y}(t)$, $\hat{v}_x(t)$, $\hat{v}_y(t)$, $\hat{a}_x(t)$ and $\hat{a}_y(t)$ are the detection values obtained by using the conventional target detection device 10 to detect the target. The values $x(t)$, $y(t)$, $v_x(t)$, $v_y(t)$, $a_x(t)$ and $a_y(t)$ are the real values. It is apparent from FIGS. 2A to 2F that between 1000 Tp$\leq$t$\leq$3000 Tp, the error value of the X component of the distance detected by the conventional target detection device 10 is about 380 cm, while the error value of the Y component of the distance is about 80 cm; the error value of the X component of the velocity is about 4.8 m/sec, while the error value of the Y component of the velocity is about 1.9 m/sec; the error value of the X component of the acceleration is about −90 m/sec$^2$, while the error value of the Y component of the acceleration is about 35 m/sec$^2$. Apparently from the figures, the conventional target detection device 10 is unable to reduce the error values effectively. Thus, the accuracy of the conventional target detection device 10 is low.

Therefore, it has always been an expectation from the user as how to provide a novel detection device aiming at the solution of above problems, which not only can improve inherent defects of prior art, but also can finish operation promptly and raise the operation accuracy. In view of the above fact, inventor of this invention thus proposes a new target detection device and its detection method to cope with the above problems.

SUMMARY OF THE INVENTION

The main object of this invention is to provide a target detection device and its detection method, which can precisely obtain the component values of the distance, the velocity and the acceleration of target by a plurality of two-stage linear Kalman filters and triangulation operation, so as to raise the detection accuracy with respect to target.

The secondary object of the present invention is to provide a target detection device and its detection method, which uses a converging unit to converge the detection results so as to reduce the time required for obtaining the components values of the distance, the velocity and the acceleration of target.

This invention relates to a target detection device and its detection method, in which the target detection device comprises a transmitting unit, a plurality of measuring units, a plurality of two-stage linear Kalman filters and an arithmetic unit. The plural two-stage linear Kalman filters correspond to the plural measuring units, the arithmetic unit is connected to the plural two-stage linear Kalman filters. The transmitting unit transmits a detecting pulse for detecting target which then reflects the detecting pulse to generate a reflected pulse. Subsequently, the plural detection units receive the reflected pulse from the target at different positions, respectively. The plural measuring units generate measured values of distance and measured values of velocity according to the reflected pulse received. Each of the plural two-stage linear Kalman filters proceeds operation according to the measured value of distance and the measured value of velocity so as to generate an estimation value of distance, an estimation value of velocity and an estimation value of acceleration, respectively. The arithmetic unit proceeds with a triangulation operation so as to generate distance component values, velocity component values and acceleration component values with respect to the target according to the estimation values of distance, the estimation values of velocity and the estimation values of acceleration. Therefore, the location of the target is detected precisely and the location of the target during the next time period is further predicted more precisely. This invention further comprises a converging unit connected to the arithmetic unit, which is used to accelerate the convergence of distance component values, velocity component values and acceleration component values with respect to the target so as to speed up the operation, furthermore to curtail the time required for detecting target.

BRIEF DESCRIPTION OF THE ACCOMPANYING DRAWINGS

DETAILED DESCRIPTION OF THE PREFERRED EMBODIMENTS

The present invention will become more apparent by the detailed description of specific embodiments in conjunction with the accompanying drawings.

Figure 1:
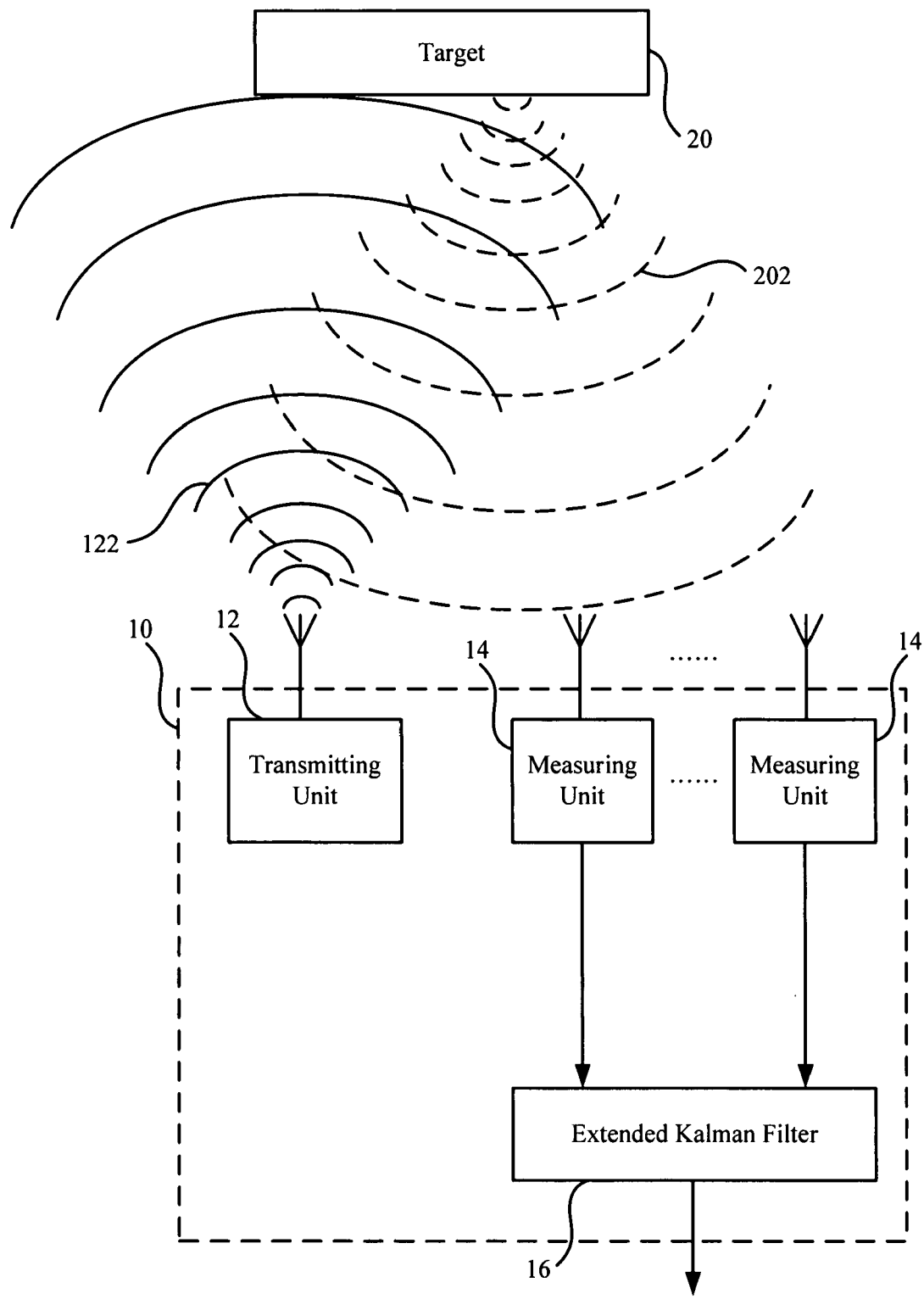
FIG. 1 is a block diagram showing a conventional target detection device.
Figure 2A:
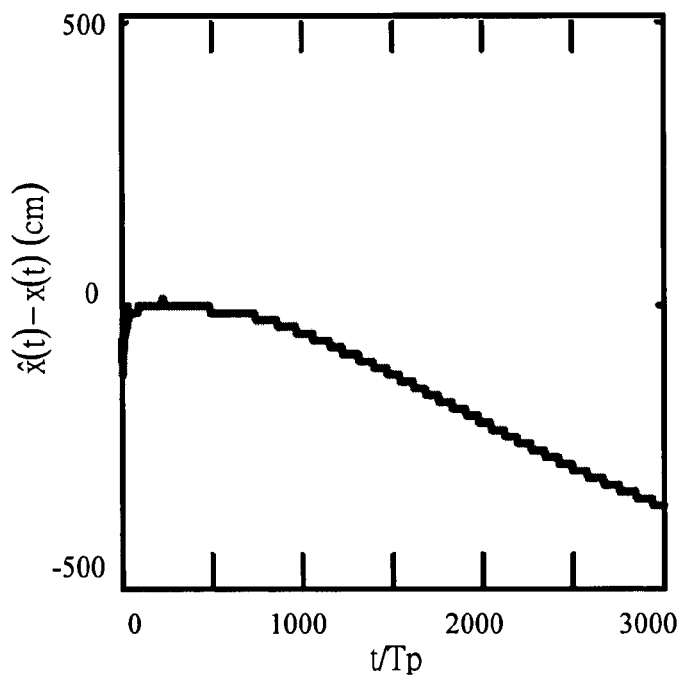
FIG. 2A is a chart showing the variation of distance error on X axis versus time.
Figure 2B:
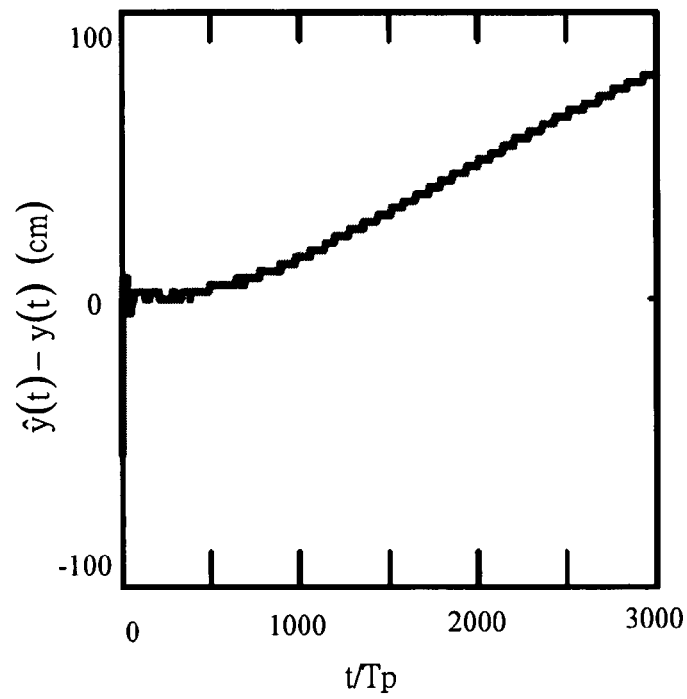
FIG. 2B is a chart showing the variation of distance error on Y axis versus time.
Figure 2C:
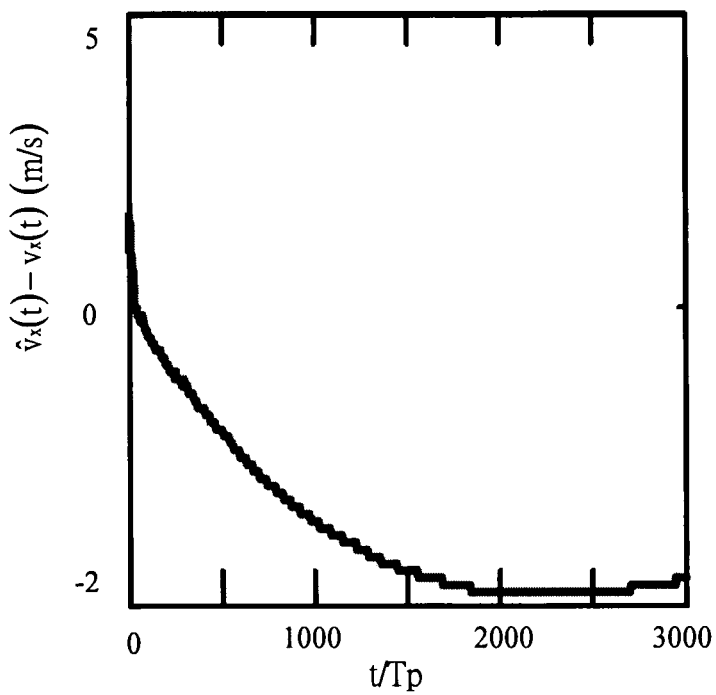
FIG. 2C is a chart showing the variation of velocity error on X axis versus time.
Figure 2D:
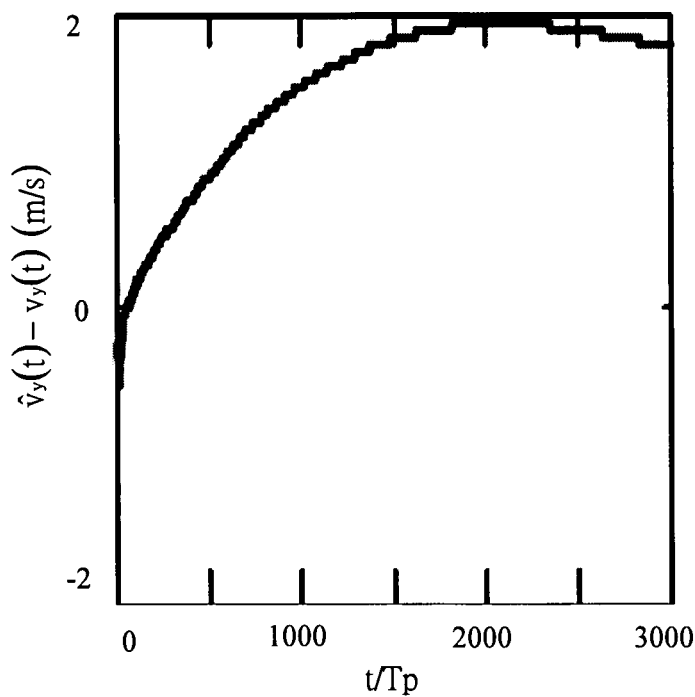
FIG. 2D is a chart showing the variation of velocity error on Y axis versus time.
Figure 2E:
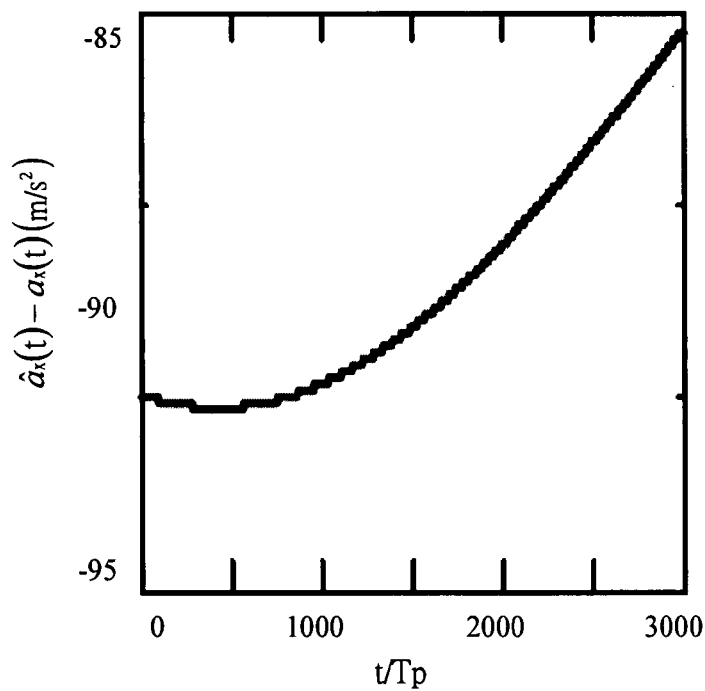
FIG. 2E is a chart showing the variation of acceleration error on X axis versus time.
Figure 2F:
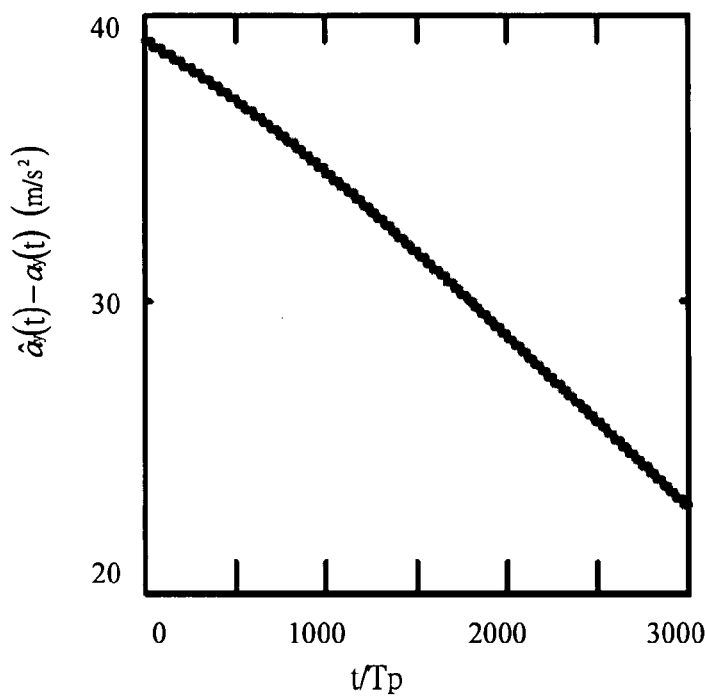
FIG. 2F is a chart showing the variation of acceleration error on Y axis versus time.
Figure 3:
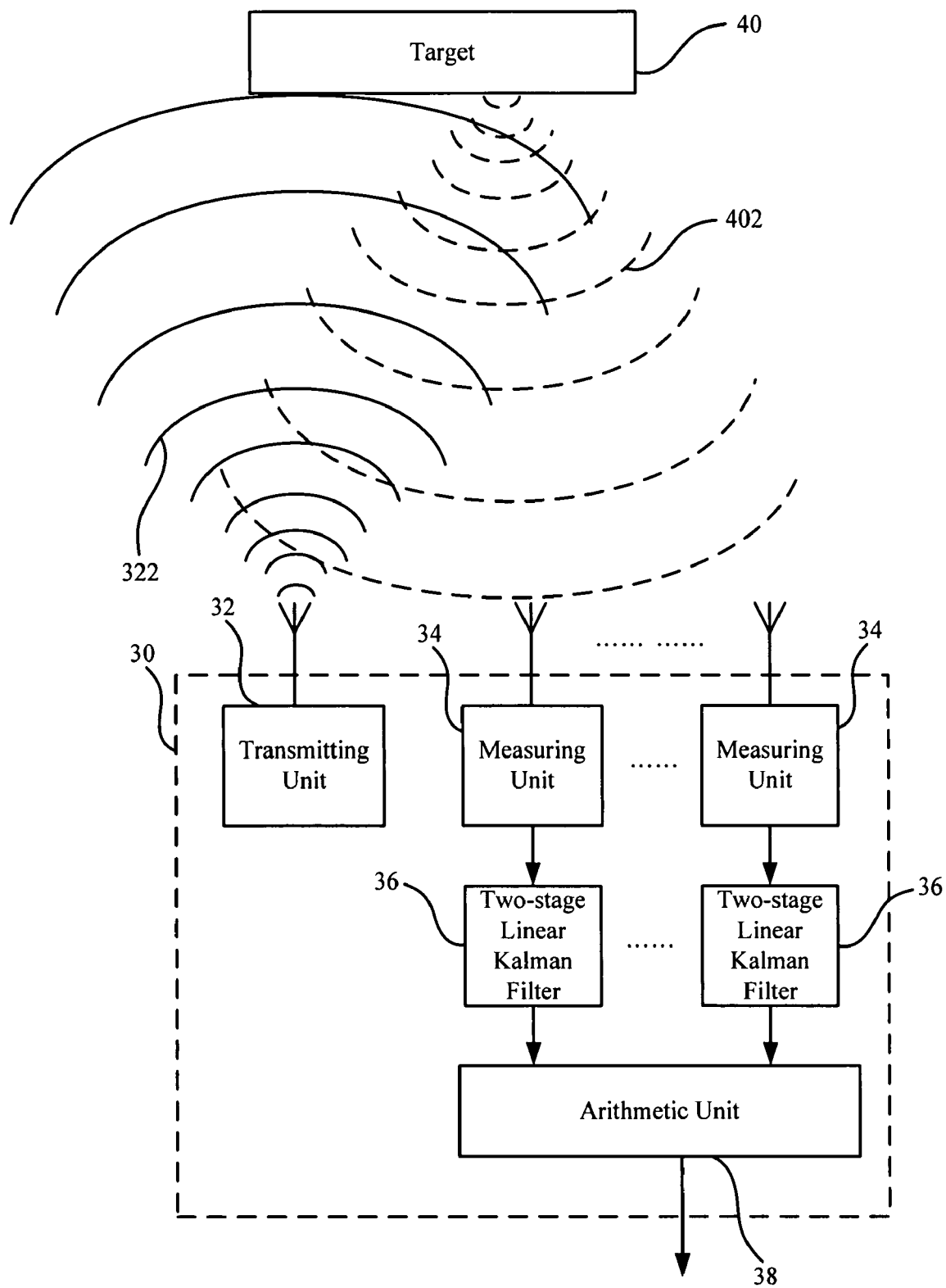
FIG. 3 is a block diagram showing an embodiment of the target detection device of the present invention.

Referring to FIG. 3, in which a block diagram of an embodiment of the target detection device of the present invention is shown. As shown in FIG. 3, the target detection device 30 comprises a transmitting unit 32, a plurality of measuring units 34, a plurality of two-stage linear Kalman filters 36 and an arithmetic unit 38. Each of the plural two-stage linear Kalman filters 36 supports one of the plural measuring units 34, while the arithmetic unit 38 is connected to the plural two-stage linear Kalman filters 36. When the target detection device 30 is used to detect a target 40, the transmitting unit 32 transmits a detecting pulse 322 for detecting the target 40 which then reflects the detecting pulse 322 to generate a reflected pulse 402. The above detecting pulse 322 is frequency modulation continuous wave (FMCW). Subsequently, the plural detection units 34 receive the reflected pulse 402 respectively at different positions. The plural measuring units 34 proceeds with a linear frequency modulation (LFM) and a frequency-shift keying (FSK) so as to generate respectively a measured value of distance and a measured value of velocity based on the reflected pulses 402 received. The plural two-stage linear Kalman filters 36 proceed operation based on the measured values of distance and the measured values of velocity generated by the measuring units 34 respectively so as to generate a plurality of distance estimation values, a plurality of velocity estimation values and a plurality of acceleration estimation values. The arithmetic unit 38 proceeds a triangulation operation based on the plural distance estimation values, the plural velocity estimation values and the plural acceleration estimation values generated from the plural two-stage linear Kalman filters 36 so as to generate component values of distance, component values of velocity and component values of acceleration with respect to the target 40.

How to make use of the triangulation operation by the present invention to obtain the component values of distance, component values of velocity and component values of acceleration with respect to the target 40 will be described as follows. Assume the location of the ith measuring unit 34 is $(X_i, 0)$, the location of the target 40 is $(\hat{x}, \hat{y})$, the velocity is $(\hat{v}_x, \hat{v}_y)$, the acceleration is $(\hat{a}_x, \hat{a}_y)$. The first and the second distance estimation values obtained by the first and the second two-stage linear Kalman filters 36 are $\hat{r}_1$ and $\hat{r}_2$ respectively; the first and the second estimation values of velocity are $\hat{v}_1$ and $\hat{v}_2$ respectively; the first and the second estimation values of acceleration are $\hat{a}_1$ and $\hat{a}_2$ respectively. The first and the second estimation values of distance $\hat{r}_1$ and $\hat{r}_2$ can be expressed as follows:

$$\hat{r}_1^2 = (\hat{x} - x_1)^2 + \hat{y}^2 \tag{1}$$

$$\hat{r}_2^2 = (\hat{x} - x_2)^2 + \hat{y}^2 \tag{2}$$

The above equations (1) and (2) can be combined as $$\hat{r}_2^2 - (\hat{x} - x_2)^2 = \hat{r}_1^2 - (\hat{x} - x_1)^2 \tag{3}$$

According to the equation (3), the component value of distance $\hat{x}$ is obtained and expressed as follows $$\hat{x} = \frac{x_1^2 - x_2^2 - \hat{r}_1^2 + \hat{r}_2^2}{2(x_1^2 - x_2^2)} \tag{4}$$

The equation (4) is substituted back to the equations (1) or (2) so as to obtain the component value of distance $\hat{y}$ which is expressed by $$\hat{y} = \sqrt{\frac{\hat{r}_1^2 + \hat{r}_2^2 - (\hat{x} - x_1)^2 - (\hat{x} - x_2)^2}{2}} \quad (5)$$

Furthermore, the first and the second estimation values of acceleration $\hat{v}_1$, $\hat{v}_2$ can be expressed as follows $$\hat{v}_1 = \frac{\hat{x} - x_1}{\hat{r}_1} \hat{v}_x + \frac{\hat{y}}{\hat{r}_1} \hat{v}_y \quad (6)$$

$$\hat{v}_2 = \frac{\hat{x} - x_2}{\hat{r}_2} \hat{v}_x + \frac{\hat{y}}{\hat{r}_2} \hat{v}_y \quad (7)$$

According to the above equations (6) and (7), the component values of velocity $\hat{V}_x$, $\hat{V}_y$ can be expressed as follows $$\begin{bmatrix} \hat{v}_x \\ \hat{v}_y \end{bmatrix} = \begin{bmatrix} \hat{x} - x_1 & \hat{y} \\ \hat{x} - x_2 & \hat{y} \end{bmatrix}^{-1} \begin{bmatrix} \hat{v}_1 \hat{r}_1 \\ \hat{v}_2 \hat{r}_2 \end{bmatrix} \quad (8)$$

Similarly, the component values of acceleration $\hat{a}_x$, $\hat{a}_y$ can be expressed as follows $$\begin{bmatrix} \hat{a}_x \\ \hat{a}_y \end{bmatrix} = \begin{bmatrix} \hat{x} - x_1 & \hat{y} \\ \hat{x} - x_2 & \hat{y} \end{bmatrix}^{-1} \begin{bmatrix} \hat{a}_1 \hat{r}_1 \\ \hat{a}_2 \hat{r}_2 \end{bmatrix} \quad (9)$$

wherein $x_1$ and $x_2$ are respectively the location of the first and the second measuring units 34.

Apparently from the above description, when the arithmetic unit 38 substitutes the estimation values generated by the two-stage linear Kalman filters 36, the present location of the target 40 is obtained and the location of the target 40 at the next time period can further be predicted.

Figure 4:
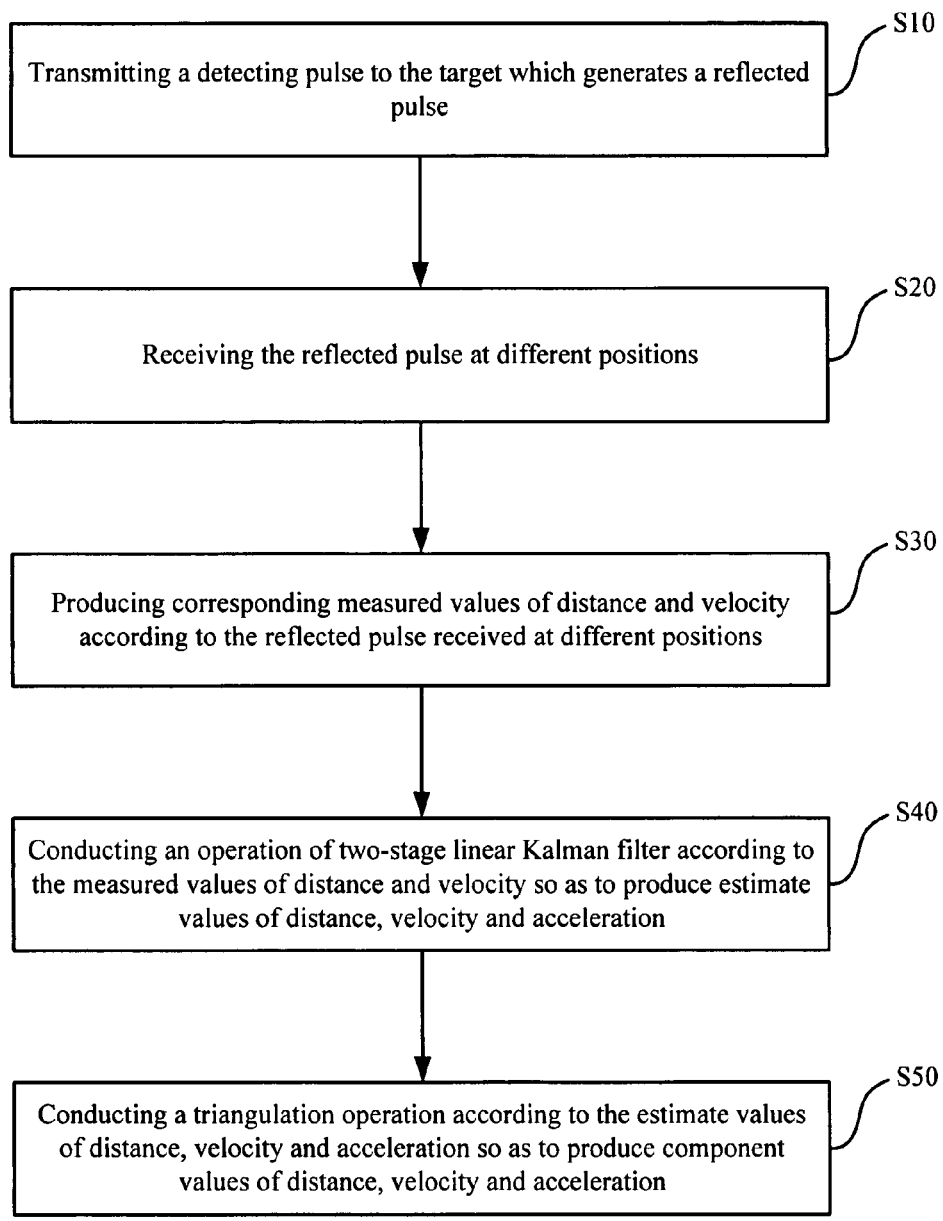
FIG. 4 is a flow chart showing an embodiment of the target detection method of the present invention.
Figure 5A:
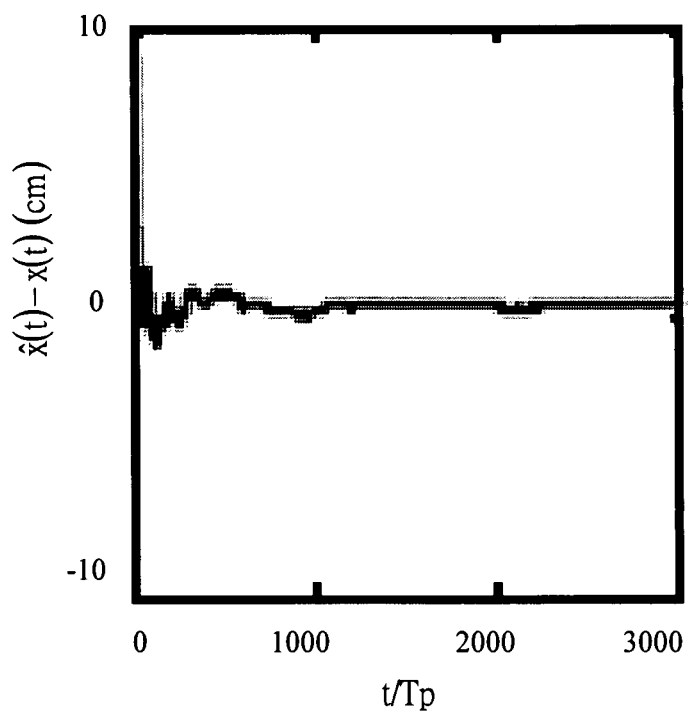
FIG. 5A is a chart showing the variation of distance error on X axis versus time.
Figure 5B:
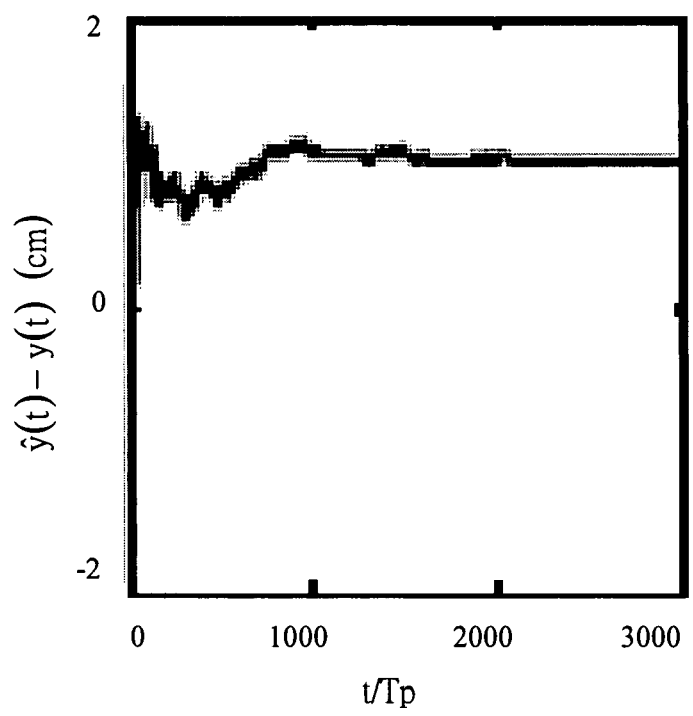
FIG. 5B is a chart showing the variation of distance error on Y axis versus time.
Figure 5C:
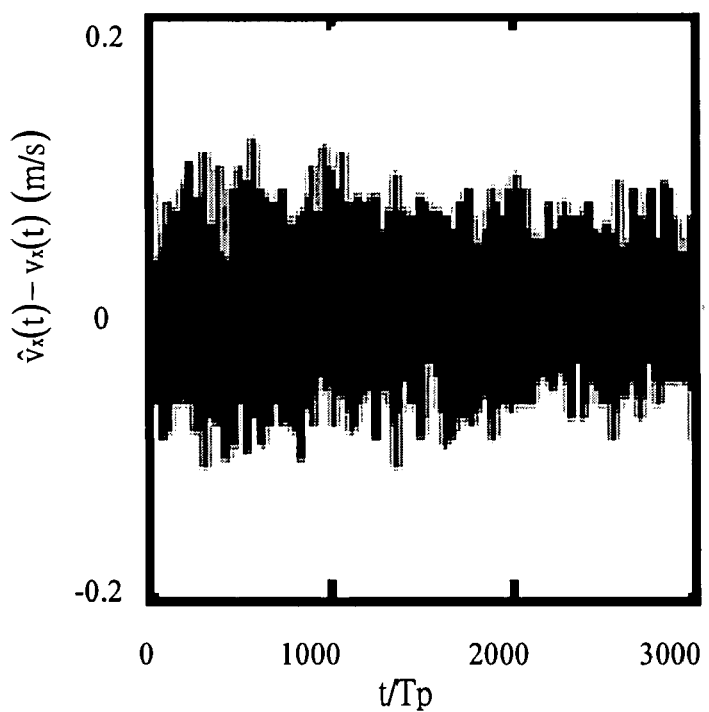
FIG. 5C is a chart showing the variation of velocity error on X axis versus time.
Figure 5D:
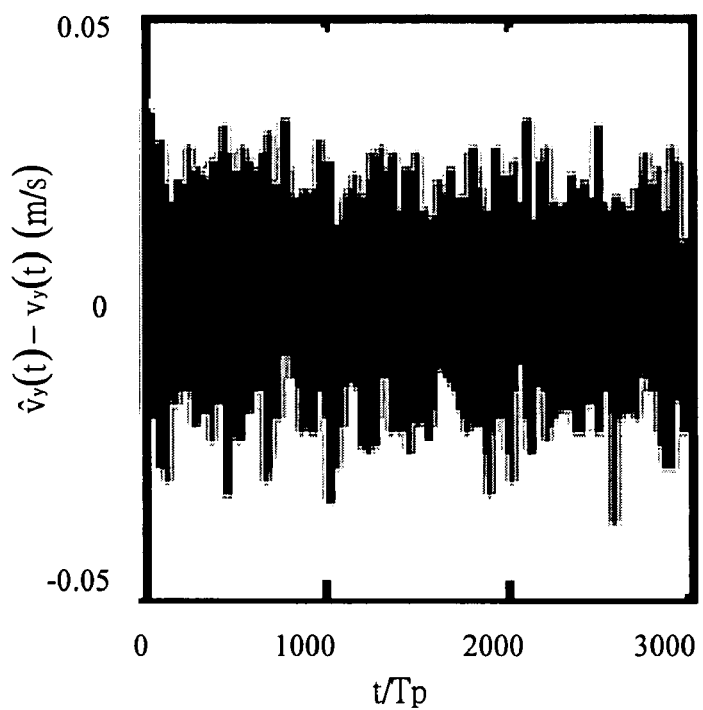
FIG. 5D is a chart showing the variation of velocity error on Y axis versus time.
Figure 5E:
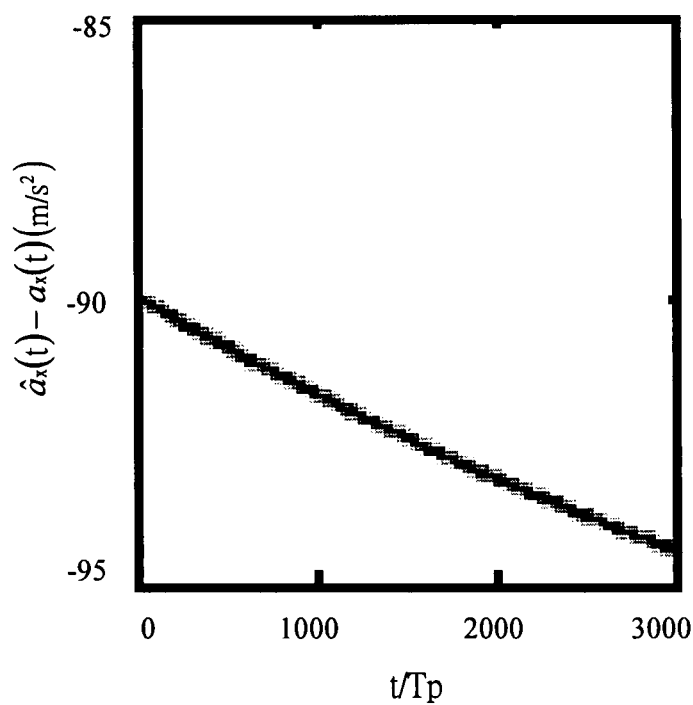
FIG. 5E is a chart showing the variation of acceleration error on X axis versus time.
Figure 5F:
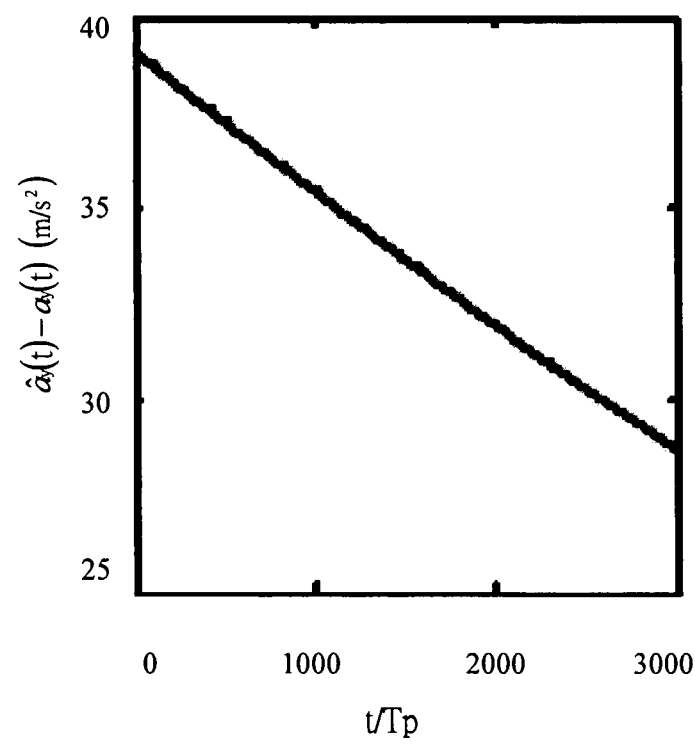
FIG. 5F is a chart showing the variation of acceleration error on Y axis versus time.

In FIG. 4, a flow chart showing an embodiment of the target detection method of the present invention is shown. As shown in FIG. 4, firstly in step S10 in the target detection method of the present invention, the transmitting unit emits a detecting pulse to the outside at first to detect target. When the detecting pulse propagates to the target, the target will reflect the detecting pulse to generate a reflected pulse. Next, as shown in step S20, the reflected pulse is received at different positions. Then, as shown in step S30, the plural measuring units generate a plurality of measured values of distance and a plurality of measured values of velocity with respect to the target according to the reflected pulse received at different positions, i.e., the relative distance and the relative velocity with respect to the target at different positions. Then, as shown in step S40, the plural two-stage linear Kalman filters respectively proceed to an operation of two-stage linear Kalman filters according to the distance measurement and the velocity measurement so as to generate estimation values of distance, estimation values of velocity and estimation values of acceleration. Finally, as shown in step S50, the arithmetic unit proceeds with a triangulation operation according to the estimation values generated in step S40 so as to generate component values of distance, component values of velocity and component values of acceleration with respect to the target.

In FIGS. 5A to 5F, charts of the variation of detection error versus time during the detection of target by using the embodiment shown in FIGS. 3 and 4 in each figure is shown. The X axes of FIGS. 5A to 5F are all t/Tp which is a time parameter, while the Y axes is error value. The values $\hat{x}(t)$, $\hat{y}(t)$, $\hat{v}_x(t)$, $\hat{v}_y(t)$, $\hat{a}_x(t)$ and $\hat{a}_y(t)$ are the detection values obtained by using the target detection device of the embodiments shown in FIGS. 3 and 4 to detect the target. The values $x(t)$, $y(t)$, $v_x(t)$, $v_y(t)$, $a_x(t)$ and $a_y(t)$ are the real values. It is apparent from FIGS. 5A to 5F, between 1000 Tp$\leq$t$\leq$3000 Tp, the error value of the X component of the distance detected by the target detection device of the above embodiments is about 2 cm, while the error value of the Y component of the distance is about 2 cm; the error value of the X component of the velocity is about 0.1 m/sec, while the error value of the Y component of the velocity is about 0.03 m/sec; the error value of the X component of the acceleration is about $-95$ m/sec$^2$, while the error value of the Y component of the acceleration is about 35 m/sec$^2$. Apparently from the figures, the estimation values generated by the target detection device 30 of the present invention tend to become stabilized. Therefore, the target detection device 30 of the present invention can reduce the error values effectively, and the error values are apparently smaller than that of the conventional target detection device 10 (as shown in FIGS. 2A to 2F). Accordingly, the accuracy of the target detection device 30 of the present invention is greater than that of the conventional target detection device 10.

Figure 6:
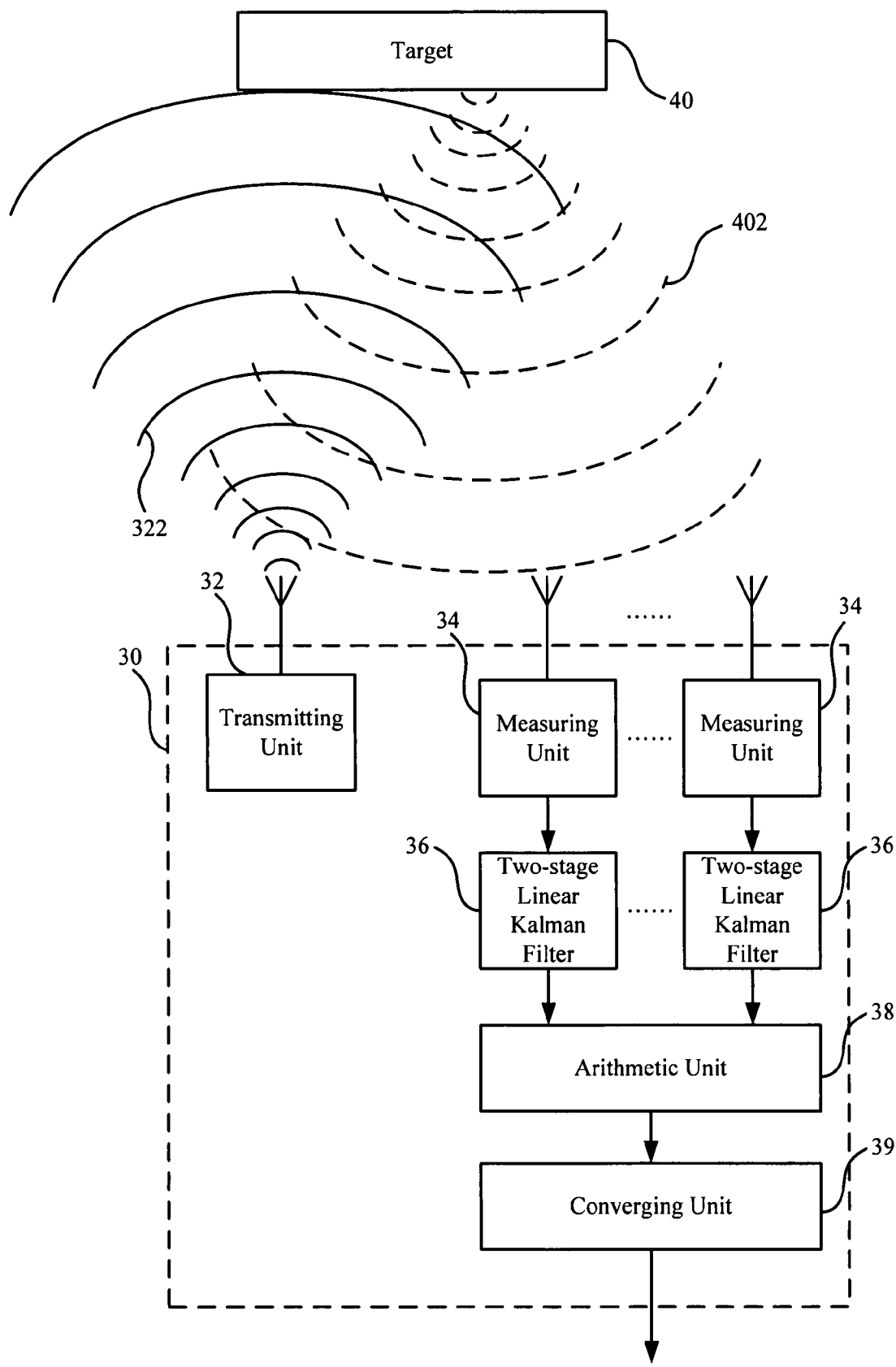
FIG. 6 is a block diagram showing an embodiment of the target detection device of the present invention.

Referring to FIG. 6, a block diagram of an embodiment of the target detection device of the present invention is shown. The difference between FIG. 3 and FIG. 6 is that a converging unit 39 is further included in FIG. 6 for converging the operation result of the arithmetic unit 38 so as to curtail the time required for detection, further to finish the detection in shorter duration. The converging unit 39 can be a one-stage linear Kalman filter. Thus, the present invention can be used to detect synchronously the present location and the location in the next time period of the target 40. For example, if the target 40 is a guided missile, then the present invention can estimate the present location and the location in the next time period of the missile so as to intercept it.

Figure 7:
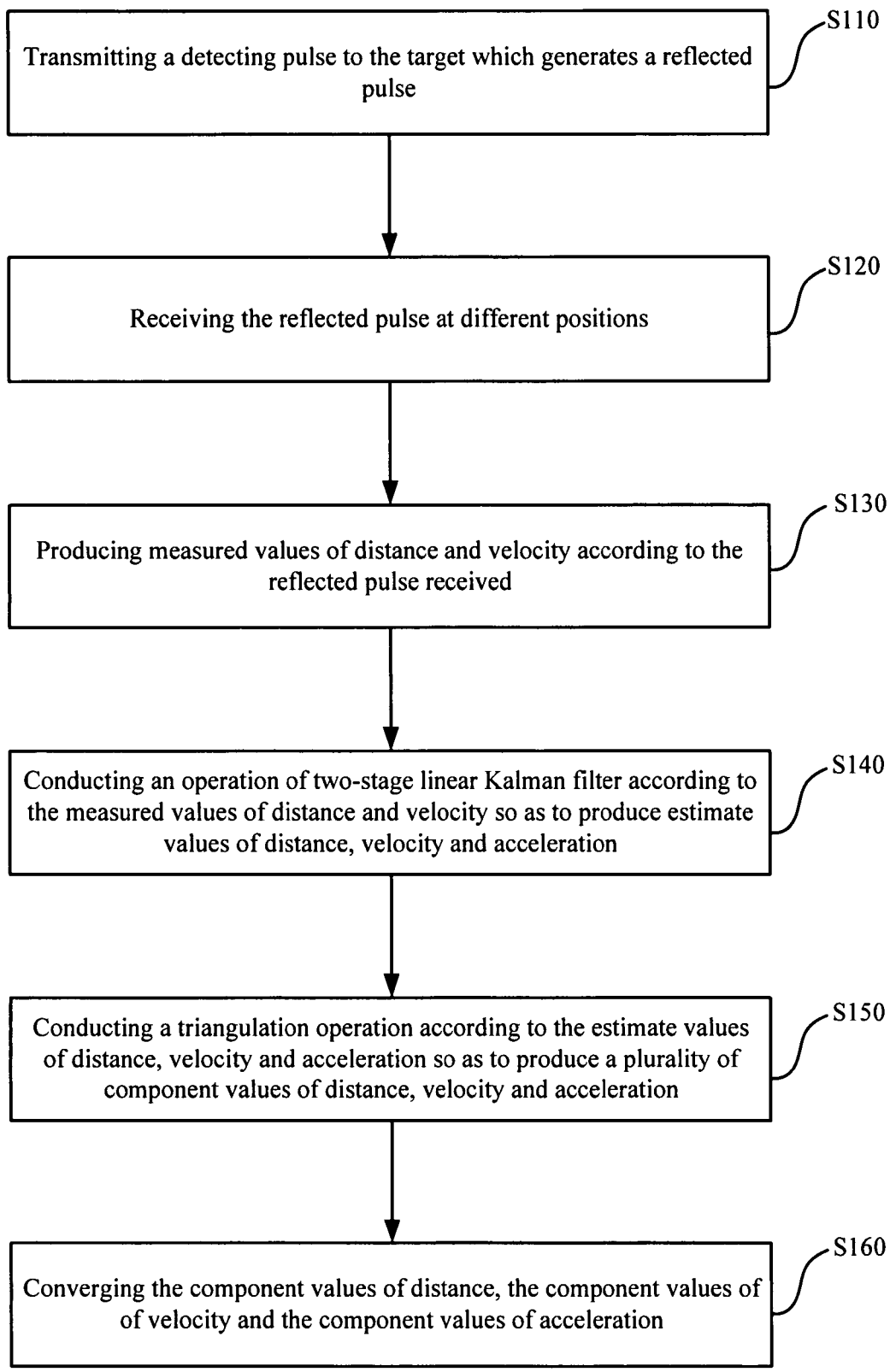
FIG. 7 is a flow chart showing an embodiment of the target detection method of the present invention.
Figure 8A:
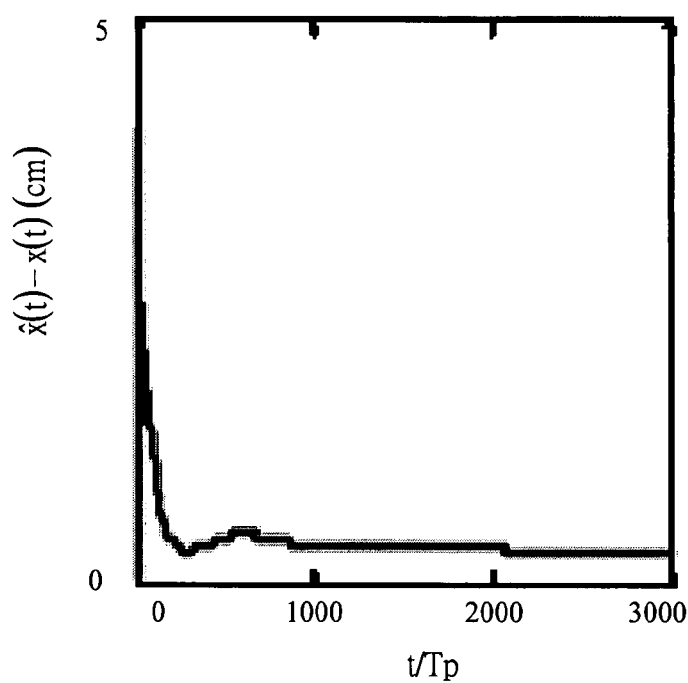
FIG. 8A is a chart showing the variation of distance error on X axis versus time.
Figure 8B:
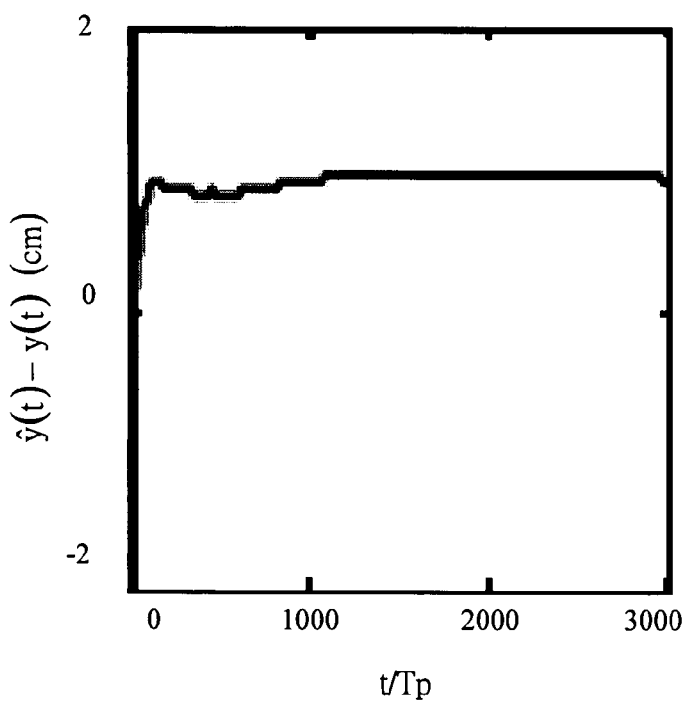
FIG. 8B is a chart showing the variation of distance error on Y axis versus time.
Figure 8C:
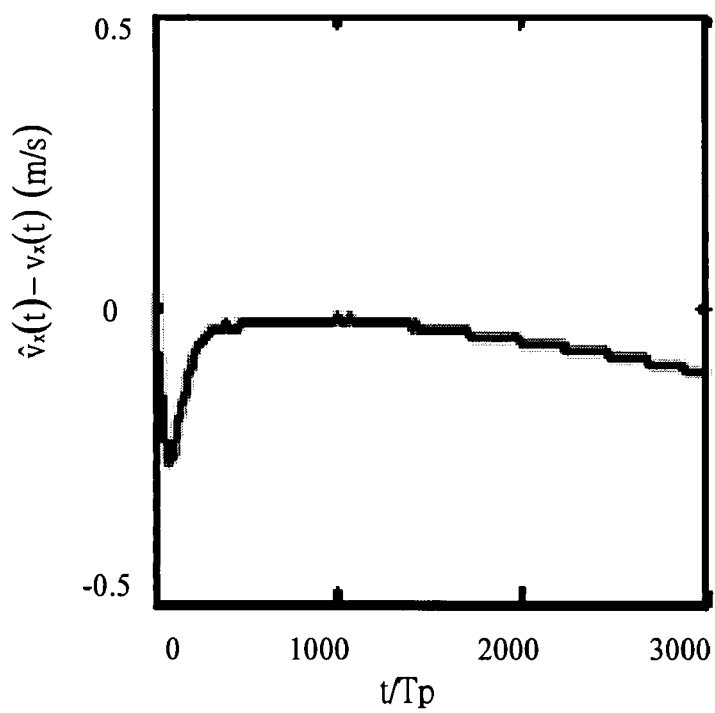
FIG. 8C is a chart showing the variation of velocity error on X axis versus time.
Figure 8D:
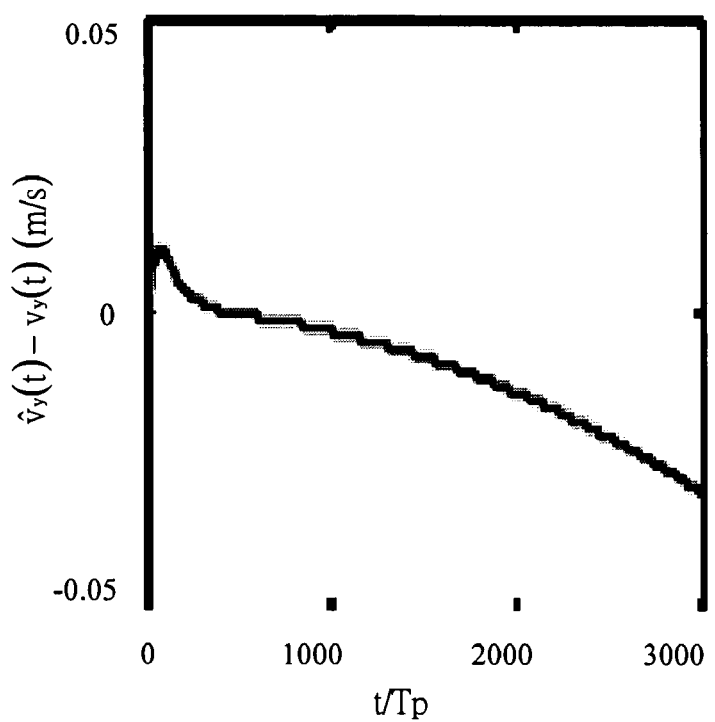
FIG. 8D is a chart showing the variation of velocity error on Y axis versus time.
Figure 8E:
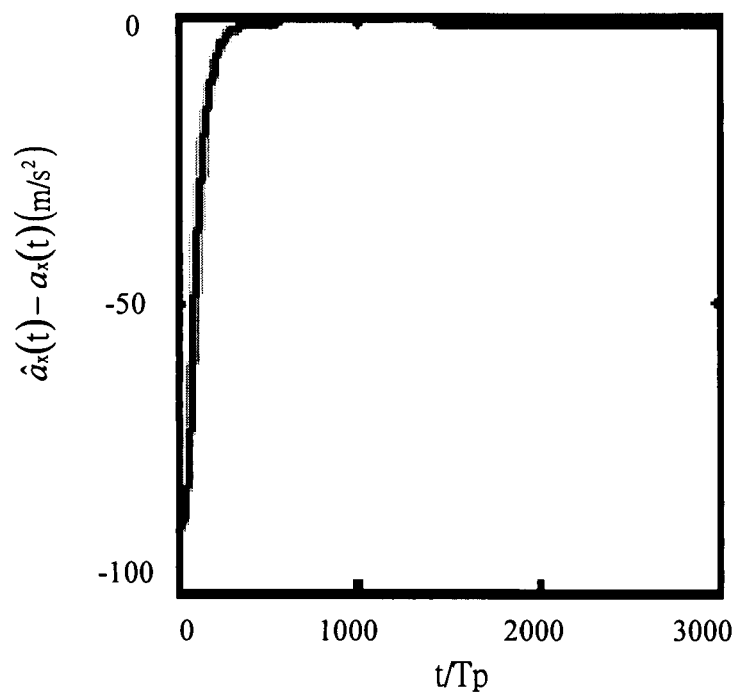
FIG. 8E is a chart showing the variation of acceleration error on X axis versus time.
Figure 8F:
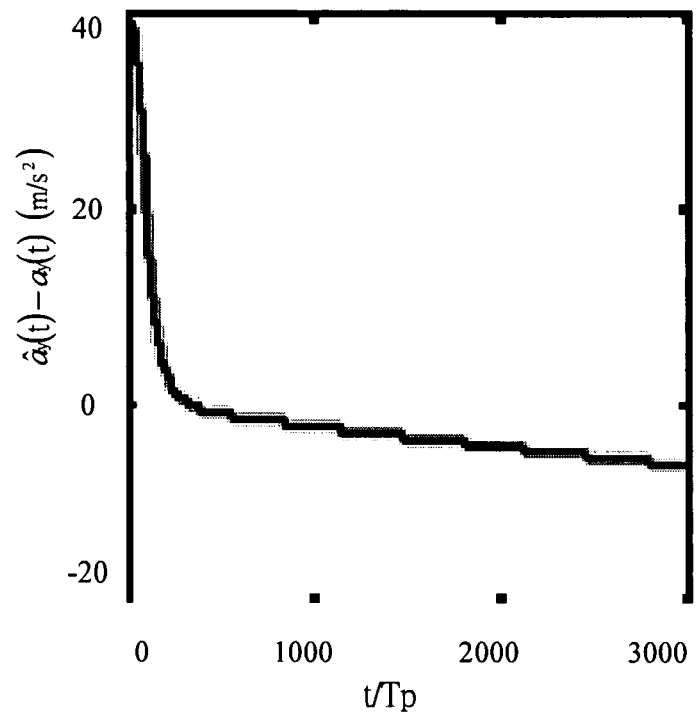
FIG. 8F is a chart showing the variation of acceleration error on Y axis versus time.

Referring to FIG. 7, in which a flow chart of an embodiment of the target detection method of the present invention is shown. The difference between FIG. 4 and FIG. 7 is that FIG. 7 further includes a step to converge component values of distance, component values of velocity and component values of acceleration in addition to the step of producing component values of distance, component values of velocity and component values of acceleration. This additional step is to converge on the component values with respect to the target so as to reduce the time required for detection, further to finish the detection of the present invention in shorter duration. The arithmetic unit proceeds operation after the convergence is proceeded by the converging unit, so that the detection result becomes more accurate, the time required for detection can be reduced to finish the detection.

In FIGS. 8A to 8F, charts of the variation of detection error versus time are smoother than that in FIGS. 5A to 5F. Apparently from FIGS. 8A to 8F, between 1000 Tp$\leq$t$\leq$3000 Tp, the error value of the X component of the distance detected by the target detection device of the above embodiments is about 4 cm, while the error value of the Y component of the distance is about 0.6 cm; the error value of the X component of the velocity is about 0.17 m/sec, while the error value of the Y component of the velocity is about 0.3 m/sec; the error value of the X component of the acceleration is about 2.6 m/sec$^2$, while the error value of the Y component of the acceleration is about 6 m/sec². In this manner, the converging unit 39 is able to get more accurate detection result, especially for acceleration.

In summary, the target detection device and its detection method of the present invention can reduce the operation error effectively so as to obtain more accurate operation result. Moreover, the present invention can speed up the operation by the converging unit so as to obtain the detection values more quickly.

Thus, the present invention is novel, obvious and available in industry, and thus is in conformity with the requirement for a patent, and a patent application is hereby submitted.

It is also noted that the abovementioned preferred embodiment is purely for the convenience of description only, not intended to be restrictive on the scope of the present invention. Any modifications and variations or the equivalents developed without departing from the spirit and principle of the present invention is considered to be still within the scope of the present invention.

What is claimed is:

1. A target detection device, comprising:
    a transmitting unit, which transmits a detecting pulse for detecting target which then reflects the detecting pulse to generate a reflected pulse;
    a plurality of measuring units, located at different positions respectively which receive said reflected pulse and generate measured values of distance and measured values of velocity according to the reflected pulses received;
    a plurality of two-stage linear Kalman filters, corresponding to said plural measuring units respectively, each of said plural two-stage linear Kalman filters proceeds an operation according to said measured value of distance and said measured value of velocity produced by corresponding measuring unit so as to generate respectively an estimation value of distance, an estimation value of velocity and an estimation value of acceleration; and
    an arithmetic unit connecting to said plural two-stage linear Kalman filters, which proceeds a triangulation operation according to said estimation values of distance, said estimation values of velocity and said estimation values of acceleration so as to generate component values of distance, component values of velocity and component values of acceleration with respect to the target.

2. A target detection device as claimed in claim 1, further comprising a converging unit connected to said arithmetic unit for converging said component values of distance, component values of velocity and component values of acceleration.

3. A target detection device as claimed in claim 2, wherein said converging unit is a one-stage linear Kalman filter.

4. A target detection device as claimed in claim 1, wherein said arithmetic unit further proceeds a triangulation operation according to the positions of said measuring units so as to generate component values of distance, component values of velocity, and component values of acceleration with respect to the target.

5. A target detection device as claimed in claim 1, wherein said detecting pulse is a frequency modulation continuous wave.

6. A target detection device as claimed in claim 1, wherein said measuring units proceed a linear frequency modulation and a frequency-shift keying so as to produce said measured values of distance and said measured values of velocity.

7. A target detection method, comprising the following steps of:
    transmitting a detecting pulse to detect a target which then reflects said detecting pulse to produce a reflected pulse;
    receiving said reflected pulse at different positions;
    generating a plurality of measured values of distance and a plurality of measured values of velocity according to said reflected pulse received at different positions;
    proceeding respectively an operation of two-stage linear Kalman filter according to said measured values of distance and said measured values of velocity so as to produce a plurality of estimation values of distance, a plurality of estimation values of velocity and estimation values of acceleration with respect to the target; and
    proceeding a triangulation operation according to said estimation values of distance, said estimation values of velocity and said estimation values of acceleration so as to generate component values of distance, component values of velocity and component values of acceleration with respect to said target.

8. A target detection method as claimed in claim 7, further comprising the step of converging the component values of distance, the component values of velocity and the component values of acceleration with respect to said target.

9. A target detection method as claimed in claim 8, wherein said step of converging the component values of distance, the component values of velocity and the component values of acceleration is to proceed an operation of a one-stage linear Kalman filter.

10. A target detection method as claimed in claim 7, wherein said step of proceeding a triangulation operation so as to generate the component values of distance, the component values of velocity and the component values of acceleration with respect to said target, said triangulation operation is further proceeded according to the location of receiving said reflected pulse so as to generate component values of distance, component values of velocity and component values of acceleration with respect to said target.

11. A target detection method as claimed in claim 7, wherein said detecting pulse is a frequency modulation continuous wave.

12. A target detection method as claimed in claim 7, wherein in said step of generating a plurality of measured values of distance and a plurality of measured values of velocity according to said reflected pulse received, a linear frequency modulation and a frequency-shift keying are proceeded so as to produce said measured values of distance and said measured values of velocity.

* * * * *